Dec. 20, 1966  F. W. R. STARP  3,292,514
PHOTOGRAPHIC CAMERA
Filed Jan. 9, 1964  3 Sheets-Sheet 1

INVENTOR.
Franz W. R. Starp
BY
Arthur A. March
ATTORNEY

Dec. 20, 1966      F. W. R. STARP      3,292,514
PHOTOGRAPHIC CAMERA
Filed Jan. 9, 1964      3 Sheets-Sheet 2

INVENTOR.
Franz W. R. Starp
BY
Arthur A. March
ATTORNEY

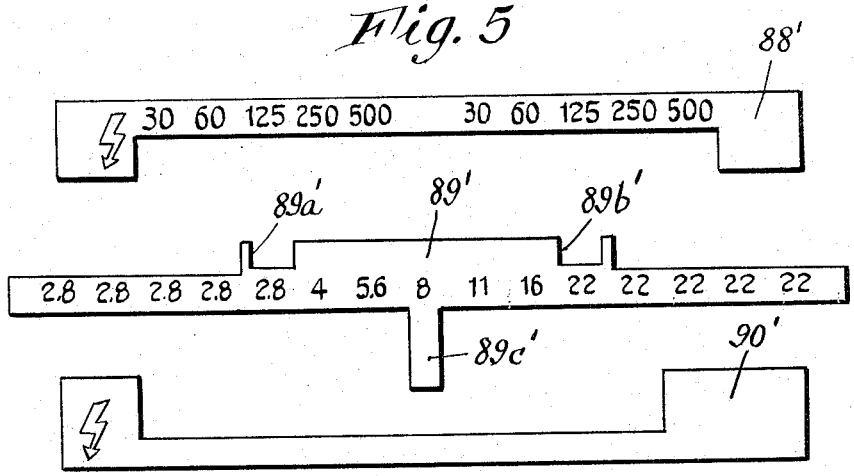
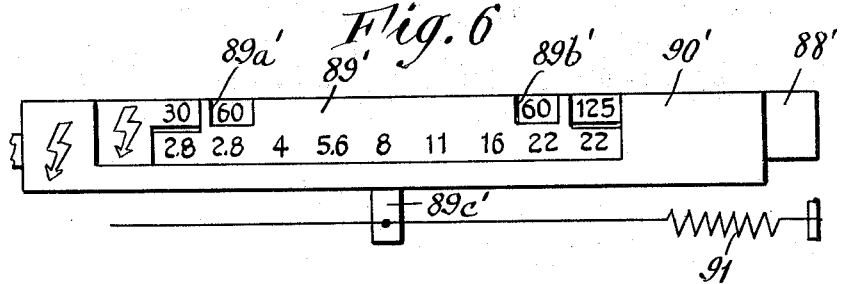
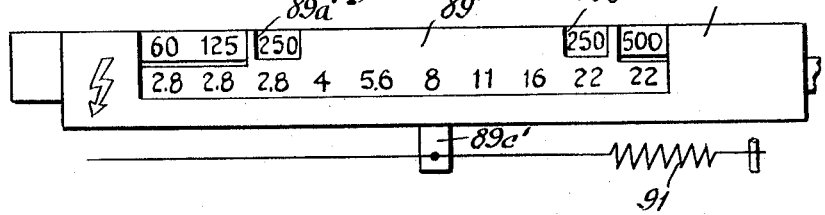

United States Patent Office 3,292,514
Patented Dec. 20, 1966

3,292,514
PHOTOGRAPHIC CAMERA
Franz W. R. Starp, Calmbach (Enz), Germany, assignor to Alfred Gauthier G.m.b.H., Calmbach (Enz), Germany, a corporation of Germany
Filed Jan. 9, 1964, Ser. No. 336,726
Claims priority, application Germany, Jan. 12, 1963, G 36,822
11 Claims. (Cl. 95—10)

This invention relates to photographic cameras having exposure meters and means to control both of the basic exposure parameters, exposure time, and diaphragm aperture size, one of which can be pre-selected and the other of which will then be set automatically under the control of the exposure meter with provision to revise the preset parameter automatically, if necessary.

Cameras of this general type have been known heretofore. In such prior cameras the pre-selectable exposure factor is the exposure time, or shutter speed, which can be set by means of a control having a scale to indicate the time value. However, because of the fact that the time value may be changed automatically, the photographer has no way of knowing, either before or after taking a picture, the precise value of the exposure time and diaphragm size actually used. This is a great disadvantage for the conscientious professional photographer, and amateurs also are likely to want to know the exposure data when they have taken successful photographs, perhaps to note such data in a notebook for future reference.

In cameras with automatic exposure time and diaphragm aperture settings carried out according to predetermined relationships, provisions have sometimes been made to reflect the exposure factors, which are set during the exposure and after the shutter release have been actuated, into the viewfinder of the camera. This merely requires two lines of numerical indicia on a scale which is movable, in response to the program setting member that determines both of the exposure values. The scale is read with respect to a mark or a window that contains the fixedly associated exposure factors. Furthermore, in cameras with pre-selectable exposure time controls which cannot be automatically corrected, it is known to indicate in the viewfinder, or in some other manner, the diaphragm aperture value that is automatically set. However, devices of this type cannot be used in cameras where one of the exposure factors is pre-selectable but subject to automatic correction, since the two exposure factors do not have a predetermined fixed relationship, but are dependent, in part, on the values selected by the photographer and in part on the meter control.

One of the primary objects of the present invention is to provide means for permitting a photographer to ascertain the actual exposure data in a camera having one automatic exposure factor control and one pre-selectable control which is subject to automatic correction.

According to the present invention, an indicating device is provided to cooperate with the exposure meter and with the control by means of which the pre-selectable exposure factor is set. This indicating device gives information about the exposure time and diaphragm values that have actually been used in making the exposure. Cooperation between the indicating device, the exposure meter, and the control that sets the pre-selectable exposure factor is accomplished by using a needle, or pointer, which is rigidly connected to the movable part, usually a coil, of the exposure meter and placing this pointer in position to indicate indicia on an indicating flag, the setting position of which is governed by the control that sets the pre-selectable exposure factor. In adition, a fixed scale carrier is directly associated with the indicating flag and with the pointer as part of the overall indicating device.

The indicating flag has a row of indicia in a scale corresponding to the setting range of the exposure factor that is set automatically. In addition, the indicating flag has at least one marking, for example a window. As a result of these factors and the fact that the markings cooperate with a row of indicia, or a scale, that corresponds to the setting range of the pre-selectable exposure factor arranged on the fixed scale carrier, the indicating flag is able to operate simultaneously as a scale and as a pointer. The arrangement of the scales on the fixed scale carrier is such that this carrier has two additional superposed scales, which are properly arranged in a common plane parallel to the plane of motion of the indicating flag. The superposed value of the rows constitute time/diaphragm values pairs which contain one of the two extreme values of the exposure factor that is set automatically.

If the indicating device is to be built into the viewfinder of the camera or is to be mirrored therein, the numerical values must be such as to be readable when looking through the viewfinder. To accomplish this, the invention comprises a particular suitable second embodiment of the indicating device which is characterized by the fact that the fixed scale carrier has two successful rows of scales associated with the pre-selectable exposure factor as well as two covering flags, or lugs, on both sides. Moreover, the indicating flag has, in addition two markings which may be windows cooperating with the rows of scales of the fixed scale carrier, a row of scales whose extreme values, which are indicated repeatedly, are plotted on the indicating flag, but are to some extent made invisible by the covering flag of the fixed scale carrier. The indicating device is thus a two-line device arranged so that no two figures can cover each other, which is very important for good readability when looking at the figures through the viewfinder. In this arrangement, the fixed scale carrier and the indicating flag must be made, at least in part, of transparent material.

If the prevailing light is not strong enough to take a properly exposed photograph, the shutter release trigger of the camera is kept locked in accordance with this invention. This makes it necessary to operate the camera with additional illuminating means, such as a flash gun. The necessity for so operating the camera is brought to the attention of the photographer by means of a special mark which follows the lowest exposure value of the operating range of the camera and is indicated on the fixed scale carrier. This mark also cooperates with the exposure meter pointer.

In addition to the exposure time and the diaphragm setting, the camera must also take into account the film sensitivity. It has been known to provide means in automatic cameras to adjust the exposure meter, by adjusting its frame, in accordance with a scale indicating film sensitivity. If this is done in a camera constructed according to the present invention, the available setting range of the camera can be determined by the photographer with the aid of the indicating device. The latter has a mask that can be controlled by a cam on the film sensitivity setting member so that the position of this mask changes for different film sensitivity settings. The mask is non-rotatably connected to the frame of the exposure meter, this frame being pivotally supported. The last-named mask may move in front of the section of the fixed scale carrier on which the special mark indicating the necessity of artificial light exposures is located, and so it is desirable to provide that portion of the mask with its own special reference mark.

Because of the fact that the shutter release trigger in the present invention is locked when there is not sufficient light, it is impossible to make under-exposed photographs.

The locking device includes means left by the motion of a sensing member that cooperates with the exposure meter. If the light is not sufficient to permit the sensing member to move, the release member remains locked. A further development of the invention includes a locking slide which has a limited guided motion that permits it to participate in the movement of the sensing member. This locking slide is guided by the frame of the exposure meter and is so arranged, with respect to the range of motion of the exposure meter pointer, that it will prevent movement of the sensing member by engaging the pointer when light conditions are insufficient to permit a suitable photographic exposure to be made.

Details of the invention will become apparent from the following specification, together with the drawings in which:

FIG. 5 shows a different set of structural members for making an alternative embodiment of the indicating device; and FIGS. 6 and 7 show the structural members of FIG. 5 assembled and in different positions while operating as an indicating device.

Figure 1:
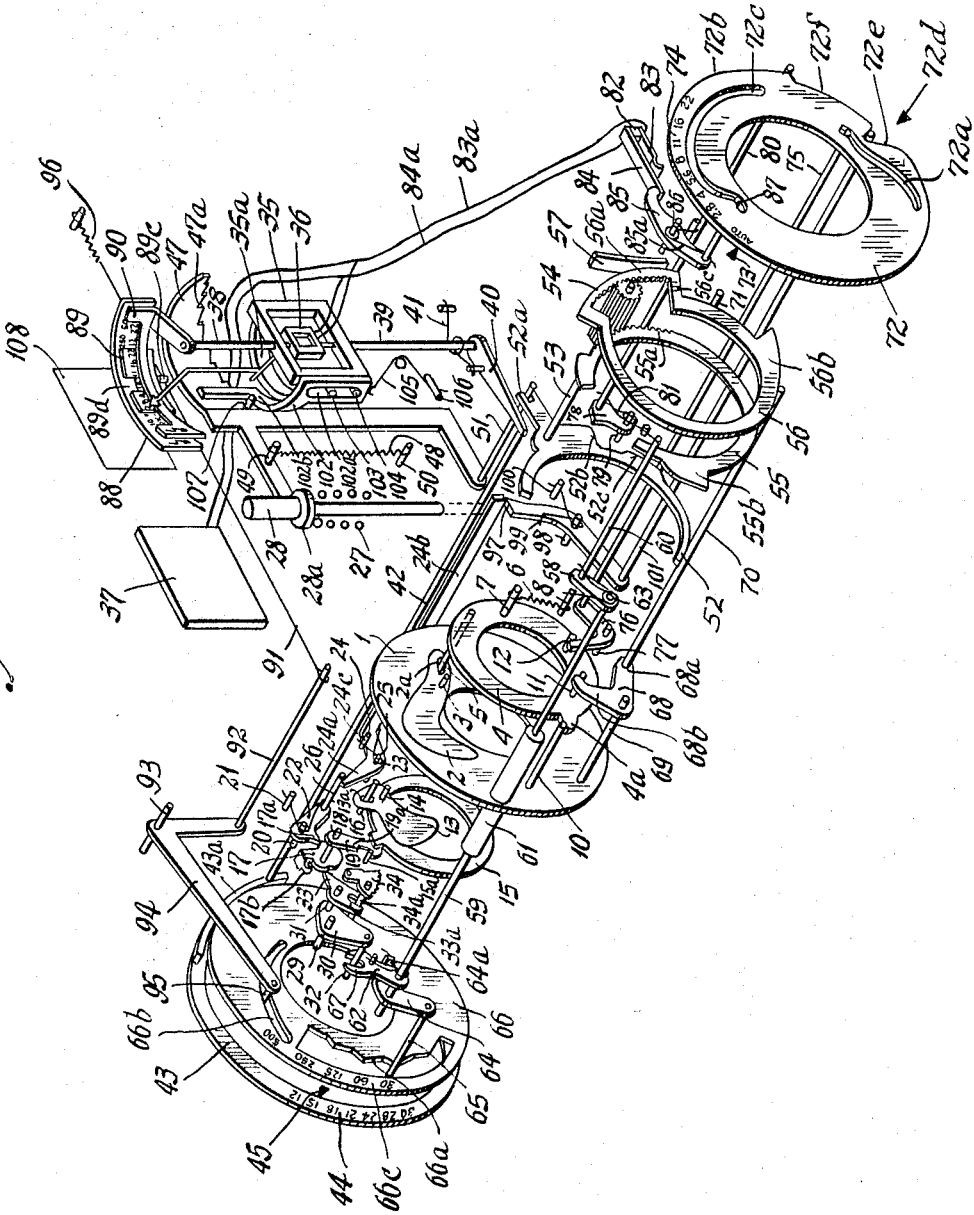
FIG. 1 is a perspective view of the device according to the invention, individual structural members of the device being separated axially for greater clarity.

In FIG. 1 a carrier plate 1 is mounted in a shutter housing (not shown) to support a plurality of diaphragm lamellae of which only one lamellae 2 is shown. The lamellae are mounted on fixed pins 3 and are actuated by a ring 4 which is able to rotate, at least to a limited extent, and which has a plurality of pins 5 that engage slots 2a in the lamellae. The ring 4 is pulled clockwise by a tension spring 6, one end of which engages a pin 7 on the ring and the other end of which is attached to a fixed pin 8. A projection 4a extends from the ring 4 and engages pin 10 on the plate 1 to serve as a stop for fixing the starting position of the ring 4 with respect to the plate 1. This starting position is, in the embodiment shown, associated with the largest aperture position of the lamellae 2 which position may correspond to a diaphragm value of 2.8 for example. The ring 4 also has two pins 11 and 12 which are engaged by load transmission members, or linkages, of the diaphragm setting mechanism that operate independently of each other as will be described hereinafter. The lamellae 2 and the other elements connected thereto, as described above, comprise the means to set one of the exposure factors, in this case the diaphragm aperture size.

As in the case of the diaphragm lamellae 2, only one of the shutter blades 13 is shown for reasons of clarity and is mounted on a pin 14 extending from a ring 15. The latter is rotatably mounted in the shutter housing so as to be coaxial with the ring 4 and a pin 16 is rigidly attached to the carrier plate 1 to engage a slot 13a in each of the shutter blades 13. The ring 15 is rotated back and forth, in a manner which is well known, by driving means comprising a rotatably mounted cocking and driving disc 17 provided with a pin 18 on which a driving pawl 19 is pivotally mounted. The pawl 19 has jaws 19a which engage an arm 15a bent at right angles to the ring 15.

An arresting lever 22 pivotally mounted on a fixed pin 20 is pressed by a coil spring 21 against a projection 17a on the disc 17 to keep the latter in cocked position as shown in the drawing. A release lever 24 pivotally mounted on a journal 23 is pressed against a fixed pin 24c by a spring 25. One arm 24a of the release lever engages a pin 26 on the arresting lever 22 while the other arm 24b extends into a path of motion of a shutter release, or trigger, 28 which is pressed upwardly by a compression spring 27 and which may be located in the camera case (not shown).

After the driving disc 17 has been released by the arresting lever 22, the disc rotates by virtue of the pressure of the usual driving spring (not shown) in a counterclockwise direction which causes the pawl 19 to rotate the ring 15 so as to pivot the shutter blades first in one direction to open the shutter and then in the reverse direction to close it again.

An escapement mechanism is provided to obtain different exposure times and is arranged in the shutter housing in a manner which has been known heretofore. This escapement mechanism comprises a plate, or lever, 30 which is pivotally mounted on a fixed pin 29 and is provided with oppositely directed pins 31 and 32. An escapement braking lever 33 is pivotally mounted on the pin 31 to cooperate with the disc 17 and with a toothed segment gear 34 connected to the lever 33 by means of a pin 34a that engages a slot 33a in the lever. If desired, the gear segment 34 may be meshed with other gear members in a manner known heretofore so as to make possible a wide range of shutter speeds. The plate 30, the braking lever 33, the toothed gear segment 34 and the gear members cooperating with the latter may be located on a fixed bearing plate in accordance with similar structures known In order to obtain different exposure times, or different shutter speeds, the arresting lever is set at different positions with respect to the lug 17b of the disc 17. This causes the lug 17b to engage the braking lever 33 over a distance determined by the position to which the braking lever is set. The setting of the braking lever is effected by the lever 30, the pin 32 of which engages a linkage connecting it to a photoelectric exposure meter.

The exposure meter includes a frame 35 and a rotating coil 36 pivotally mounted therein. It also includes a photocell 37 electrically connected to the coil 35 to supply an electric current thereto corresponding in intensity to the intensity of light striking the photocell from the scene to be photographed. The frame has two end shafts 38 and 39 which are coaxial with the axis of the rotating coil 36 and which are pivotally mounted in fixed bearings. A lever 40 is rigidly attached to the shaft 39 and the free end of the lever 40 is pressed, by means of a spring 41, against a transmission pin 42 which is movable in a direction parallel to the optical axis of the shutter. The pin 42 bears against the face of a cam 43a on a film sensitivity setting member 43 which may be rotated about the optical axis of the shutter to take the film sensitivity into consideration. The sensitivity is indicated on a scale 44 which may be set with respect to a fixed mark 45.

Returning to the exposure meter, a needle 46 is affixed to the coil 36 to indicate the light intensity but, because the coil 36 may be preset by the lever 40 and the pin 42, the position of the needle 46 is modified by the setting of the film sensitivity control 43. Part of the mechanism connecting the exposure meter to other portions of the shutter is a sensing member 47 which is made in the form of a slide capable of being moved parallel to the direction of travel of the shutter release trigger 28. The sensing member has an arm that is held against a flange 28a on the trigger by means of a spring 48 so that the slide moves downwardly when the trigger is depressed to make a photographic exposure. The spring is stretched between the pin 49 on the sensing member 47 and a fixed pin 50. This spring is somewhat weaker than the spring 27 so that the latter controls the position of the shutter release except when the photographer overcomes it in order to make an exposure. The sensing member 47 has a stepped cam 47a, one of the steps of which comes to rest on the lower extension of the needle 46 when the shutter release 28 is depressed so as to leave the sensing member free to move downwardly under the force of the spring 48. To keep the needle 46 from absorbing all of the force of the spring 48, a supporting member in the form of an arch 35a is provided on the frame 35.

The sensing member 47 is operatively connected by means of a pin 51 with a rotatable setting ring 52 coaxial with the optical axis. The connection between the pin 51 and the ring 52 is a slot 52a on an arm extending from the ring. The setting ring has a pin 53 on which a pinion 54 is rotatably mounted. This pinion engages the external teeth 55a of a ring 55, which is also coaxial with the optical axis and which may be used to set the exposure time of the shutter by adjusting the shutter speed escapement mechanism, and the pinion also is meshed with the internal teeth 56a of another ring 56 which is also coaxial with the optical axis and cooperates with the ring 4 that positions the diaphragm lamellae 2. A brake, which may take the form of a leaf spring 57, engages the outer circumference of the ring 56 to increase the starting moment of rotation of that ring and make it less easy to turn initially than the ring 55. Thus when the setting ring 52 is rotated clockwise under pressure from the sensing member 47, the axle 53 of the pinion 54 is carried along in the same clockwise direction and, since the brake 57 makes the ring 56 initially resist movement, the pinion rotates on its axle and drives the ring 55 clockwise by means of the teeth 55a.

Of the two exposure factors, shutter speed and diaphragm aperture, the embodiment of FIG. 1 uses the ring 55 for affecting the shutter speed and the ring 56 for affecting the diaphragm setting. To accomplish this the ring 55 has a cam 55b which increases radially outwardly and which acts upon the aforementioned linkage, or load transmission mechanism, that sets the shutter speed escapement mechanism. This linkage consists in the present embodiment, of a lever 58 which is rigidly attached to a shaft 59 that extends parallel to the optical axis of the shutter and carries a pin 60 which acts as a cam follower bearing against the cam 55b. The shaft 59 may be pivotally mounted in a sleeve 61 affixed to the carrier plate 1 and may carry at the end remote from the lever 58 a lever 62 with a forked end that embraces the pin 32 of the lever 30. The lever 62 is rigidly attached to the shaft 59. A spring 63 on the shaft exerts pressure between the fixed pin 8 and the pin 60 to urge the shaft 59 to rotate in the clockwise direction, thus tending to keep the linkage 58 to 60 and 62 and the shutter speed escapement mechanism connected thereto in the starting position associated with the longest exposure time, or slowest speed of the shutter. This may be, typically, 1/30 second. Sensing means including lever 64 is also rotatably mounted on the end of the shaft 59 beyond the lever 62 and is provided with a sensing pin 65 that serves as a cam follower for a cam 66a on the shutter speed setting control 66. In the embodiment shown, this control sets the manually preselectable exposure factor, which in this case is the shutter speed. The control 66 is set with respect to the fixed mark 45 by reference to a scale 66c of shutter speeds. The setting of the control 66 is transmitted to the shutter speed escapement mechanism by means of an arm 64a on the sensing lever 64. The arm 64a is engaged by a spring 67 which urges it into contact with the forked lever 62 so as to obtain a unilateral driving connection which is operative in the clockwise direction.

Like the ring 55, the ring 56 also carries a radially ascending cam 56b which influences the position of the diaphragm control ring 4. The transmission of control influence from the cam 56 to the ring 4 is effected by a linkage which includes a bellcrank lever 68 pivotally mounted on a pin 69 on the carrier plate 1. One arm 68a of the lever 68 has a pin 70 that serves as a cam follower riding upon the surface of the cam 56b while the other arm 68b presses against the pin 11 of the ring 4. Upon clockwise rotation of the ring 56, the diaphragm lamellae 2 are moved in toward positions of increasingly smaller diaphragm aperture. When the lamellae reach the position of smallest diaphragm aperture, an edge 56c of the ring 56 strikes a fixed pin 71 and stops any further clockwise rotation of the ring.

The arrangement of FIG. 1 includes not only means for automatically controlling one exposure factor after preselection of the other factor, which means have been set forth hereinabove, but also means for controlling the one exposure factor manually as may be necessary, for example, when taking photoflash pictures. For this purpose a diaphragm aperture setting ring, or control 72 is provided which may be set with the aid of a fixed mark 73 at various positions including a position marked "Auto" as well as positions indicated by a scale 74 comprising all of the diaphragm numbers of the diaphragm and lens being used. If the word "Auto" is placed opposite the mark 73, the diaphragm will be set automatically using the apparatus described hereinabove. However, if the control 72 is set so that one of the numerical indicia of the scale 74 is opposite the mark 73, the automatic exposure setting device will be rendered inoperative and the diaphragm lamellae 2 will be set manually. For this purpose the diaphragm control 72 has a slot 72a which is engaged by a pin 75. The latter is affixed to a bell crank lever 76 which is pivotally mounted on a pin 77 and which has a free arm that engages the pin 12 of the diaphragm control ring 4.

The diaphragm control 72 disconnects or renders inoperative the automatic mechanism by way of an arresting lever 78 which becomes operative when the diaphragm control is set to its manual range of positions. Since the shutter speed has been referred to, for the sake of clarity, as the preselectable exposure factor, the diaphragm setting may be considered the other exposure factor and thus the setting of the other exposure factor to a manually controlled location will disconnect the automatic controls. The arresting lever 78 engages a projection 52b of the setting ring 52 which is so arranged as to be capable the rings 52 and 56 in their respective starting positions as shown in the drawing. The lever 78 is pivotally mounted on a pin 79 and has a pin 80 that engages the outer circumference of the diaphragm control 72 under the force of a spring 81. In the position "Auto" shown in FIG. 1, the pin 80 engages the peripheral section 72b of the diaphragm control 72 which holds the arresting lever 78 in its non-blocking position. If the diaphragm control is placed in the "Manual" setting range the pin 80 engages the peripheral section 72f allowing the arresting lever 78 to pivot counterclockwise under the force of the spring 81, thus moving the lever 78 into the path of projection 52b.

In addition to interrupting mechanically the automatic operation of the mechanism when the diaphragm control 72 is moved into one of its manual range of positions, a switch is provided which includes contact springs 83 and 84 spaced apart by an insulator 82 and connected to the photocell 37 and to the coil 36 by way of wires 83a and 84a to short-circuit the photocell and thus to prevent current from flowing in the rotating coil 36. This renders the automatic mechanism electrically inoperative. The contact spring 84 is pressed against the spring 83 by a lever 85 pivotally mounted on a fixed pin 86. A spring 85a urges the lever to rotate in the clockwise direction but it is prevented from doing so, except in a controlled manner, by a pin 87 that engages a control slot 72c of the diaphragm control 72. This slot is so shaped that the connection between the contacts 83 and 84 is broken when the diaphragm control is placed in its "Auto" position but the connection is made when the diaphragm control is set to any position within its manual range of positions indicated by the scale 74.

The operation of the foregoing device will now be described as it permits automatic control of one exposure factor after preselection of the other exposure factor and overriding correction of the preselected factor. It should be noted that the operation starts with the shutter speed set to the longest exposure time and with the diaphragm set to the largest aperture and proceeds toward shorter exposure times, or faster shutter speeds, and smaller diaphragm apertures. Basically there are three different cases: Case A—Too Little Light, in which case the preselected exposure time cannot be attained; Case B—Sufficient Light, in which case the preselected exposure time is used and a proper corresponding diaphragm aperture is automatically set; and Case C—Too Much Light, in which case the preselected exposure time is too great so that a shorter exposure time is actually set by the escapement mechanism.

CASE A—TOO LITTLE LIGHT

This condition results from a mistake by the photographer in setting the shutter speed control 66 to a speed value on the scale 66c that does not permit the shutter blades 13 to be open long enough to make a satisfactory exposure even if the diaphragm lamellae 2 remain in their most open position. When the shutter release 28 is depressed under such circumstances, the position of the exposure meter needle 46, as governed by the current produced in the photocell 37 and by the position of the arm 40 under control of the pin 42 and the cam 43a, will be such that the needle will be relatively far to the left in its range of positions and thus the sensing member 47 will be able to move downwardly only a very short distance before one of the steps on the stepped cam 47a strikes the exposure meter needle. As a result of this small movement of the sensing member 47, the setting ring 52 will likewise be moved through only a small angle.

Because the ring 56 is prevented from moving by the brake 57, the pinion 54 begins to roll on the internal teeth 56a, thereby driving the ring 55 clockwise. This causes the cam 55b to move the pin 60 and thereby to pivot the pin 59 and the forked lever 62, together with the sensing lever 64, in the counterclockwise direction. As a result, the sensing pin 65, which initially occupies a position close to the outer arcuate edge of the shutter speed control 66, moves toward the step on the cam 66a that happens to be opposite the pin 65, but does not reach this step before the rotary motion of the ring 55, and hence the movement of the pin 65, is terminated. This causes the forked lever 62 to stop in a position which does not correspond to the previously set exposure time, but instead to a longer exposure time. As a consequence, the escapement means which operates the shutter blades 13 and which are controlled directly by the position of lever 62 and only indirectly by the shutter speed control 66 will cause the shutter blades 13 to remain open for a longer time than is indicated on the scale 66c.

The diaphragm setting mechanism remains in its initial position with the diaphragm lamellae at positions corresponding to the largest aperture. This happens because the rotary motion of the ring 55 stops before the pin 65 strikes the cam 66a. As is normally the case, the continued movement of the shutter release trigger 28 strikes the release lever 24 which, in turn, drives the arresting lever 22 and releases the disc 17 so that it is able to run down and to operate the shutter blades 13.

What has happened is that the mechanism has automatically caused the exposure to be made with the largest diaphragm opening and at a shutter speed longer than expected by the photographer, but suitable to make a satisfactory exposure of the film.

CASE B—SUFFICIENT LIGHT

This case corresponds to a rather wide range of shutter speed settings which cause the shutter to be open for at least a time long enough to make an exposure when the diaphragm is set at its largest aperture value, but not so long as to over-expose the film when the diaphragm is moved by the automatic mechanism to its smallest aperture setting. As in all cases, the exposure begins with depression of the shutter release 28. The needle 46 may be at any of its positions and the sensing member 47 will move downwardly until one of the steps of the stepped cam 47a strikes the needle. In so doing, the ring 52 will be turned, thus causing the pinion 54 to be rotated by the internal teeth 56a and to rotate the ring 55. This, in turn, rotates the pin 59 until the sensing pin 65 strikes the particular step of cam 66a that happens to have been placed opposite the pin 65 by the setting of the shutter speed scale 66c with reference to the mark 45. At the same time, the levers 62 and 64 both move counterclockwise.

If the sensing member continues to move downwardly after the pin 65 makes contact with one of the steps of the cam 66a, the setting ring 52 and the pinion 54 continue to rotate. However, this rotary motion can no longer cause the shaft 59 to rotate. Instead, the spring 67 now comes into operation to inter-connect the two levers 62 and 64, while allowing relative rotary motion between them in one direction. The strength of the spring is chosen so that a greater force is required to overcome the pressure of the spring 67 by rotating the ring 55 than is required for overcoming the drag of the brake 57 on the ring 56. As a result, the pinion 54 no longer continues to be rotated by the internal gear teeth 56a but instead is rotated by the external gear teeth 55a, thereby driving the gear teeth 56a and thus turning the ring 56 clockwise. The preselected shutter speed thus remains set, while the additional motion of the sensing member 47 causes the automatic movement of the diaphragm lamellae 2 by way of the cam 56b acting on the cam follower pin 70 and pivoting the lever 68 so as to rotate the setting ring 4 to the proper position to set the diaphragm aperture size exposure factor to correspond with the preselected shutter speed and the available light.

CASE C—TOO MUCH LIGHT

This condition arises when the photographer sets the shutter speed at such a low value that an over-exposure of the film would be made even if the diaphragm were automatically set to its smallest aperture value.

Upon depression of the trigger 28 and movement of the sensing member 47 and corresponding movement of the ring 52, the pinion 54 and ring 55, and the pin 65 to the point at which further movement of the pin 65 is halted by coming in contact with one of the steps of the cam 66a, and upon further movement of the sensing member 47 beyond the position in which the ring 56 has moved the diaphragm setting ring 4 to a position in which the lamellae 2 are closed to their smallest aperture value, the edge 56c of the ring 56 will finally strike the fixed pin 71 and will thereby prevent any further rotation of the ring 56. This again reverses the operation of the pinion 54, which, being unable any further to rotate the ring 56, must itself be rotated by the internal teeth 56a, thereby renewing the rotation of the ring 55. This causes the forked lever 62 to rotate in spite of the force of the spring 67, thus lifting the forked lever 62 away from the sensing lever 64 and moving the forked lever so as to pivot the lever 30 and to set the escapement mechanism to a value which will result in a shorter exposure than that for which the shutter speed control 66 was originally pre-set.

In each of the above-described cases, the diaphragm control, or setting member, 72 is, as already indicated, in the "Auto" setting position. If the daphragm control 72 is so rotated that one of the diaphragm values marked on the scale 74 is opposite the mark 73, the automatic setting device will be blocked by means of the arresting lever 78 acting on the setting ring 52. At the same time, the switch comprising contacts 83 and 84 will be closed by the lever 85, thus short-circuiting the photocell 37 and causing the exposure meter needle 46 to return to its starting position. Both the setting ring 52 and the two rings 55 and 56 will also return to and remain in their starting positions, corresponding to a setting of the longest exposure time and of the largest diaphragm aperture. In the embodiment of FIG. 1, this corresponds to an exposure time of $\frac{1}{30}$ sec. and a diaphragm value of "2.8". In this setting position, the sensing pin 65 of the sensing lever 64 is free, so that there is no change in the exposure time setting when the shutter speed control 66 is rotated. This manner of setting the exposure factors of the camera, which, at a constant exposure time of 1/30 sec., allows the manual setting of the diaphragm according to the scale 74 in the range from a diaphragm value of "2.8" to a diaphragm value of "22," is predominantly used for flash photography.

As is apparent from the drawing, the camera is equipped with an indicating device which, in addition to indicating the preselected exposure time values, informs the photographer about the values of exposure time and diaphragm which have actually been set during the automatic exposure setting and which also permits conclusions to be drawn as to whether useful photographs may be expected to be taken under the prevailing light conditions. The structure and its operation will be explained in connection with two embodiments.

Figure 2:
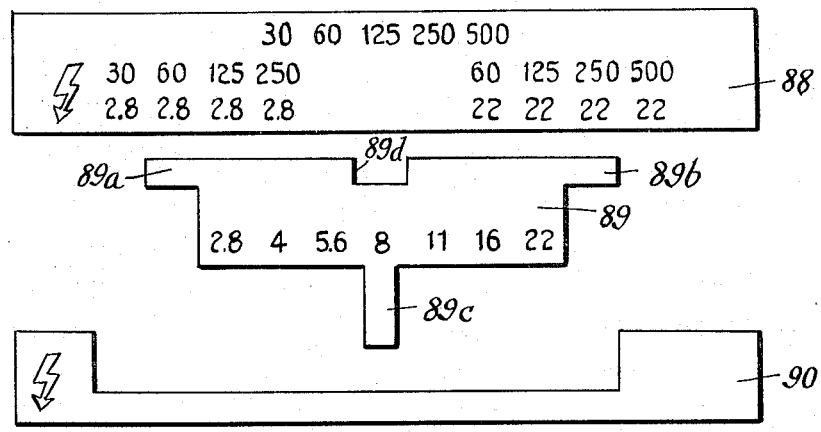
FIG. 2 shows key structural members of the indicating device of FIG. 1 as these structural members appear prior to assembly.

The indicating device according to the embodiment in FIGS. 1–4 comprises, in addition to the exposure meter needle 46, three main components, which are shown separated in FIG. 2. These are: A fixed scale carrier 88 extending over the entire range of motion of the exposure meter needle 46, an indicating flag 89, which cooperates with the scale carrier, and the setting position of which can be influenced by the control 66. Associated with these structural members is a mask 90 which can be controlled by means of the film sensitivity control 43. The fixed scale carrier 88 comprises three scale rows. The upper scale row is associated with the preselectable exposure factor, which, in the present embodiment, is the exposure time. The upper row therefore shows numerical values which correspond to the scale 66c of the shutter speed control 66. The middle and the lower scale rows are subdivided into a left and a right scale group. The middle scale row of the left scale group is composed of numerical values which happen, in the present embodiment, to be equivalent to exposure times from 1/30 sec. to 1/250 sec., while the middle scale row of the right scale group shows the numerical values which are identical with exposure times from 1/60 sec. to 1/500 sec. Together with the middlescale row on the left, there also appears several times the extremely high diaphragm value "2.8," while the extremely low diaphragm value "22" appears several times in the lower scale row on the right.

Figure 3:
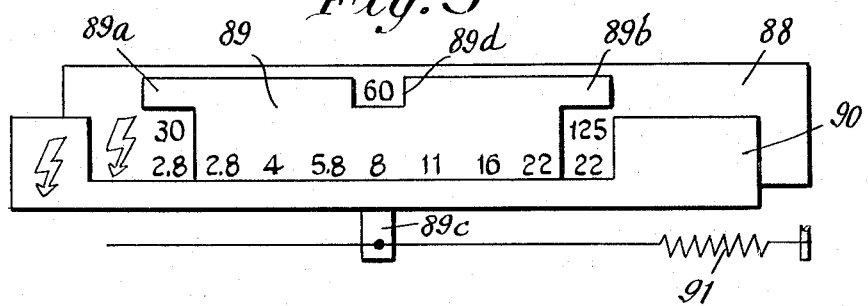
FIGS. 3 and 4 show different indicating positions of the indicating device after assembly of the structural members of FIG. 2.
Figure 4:
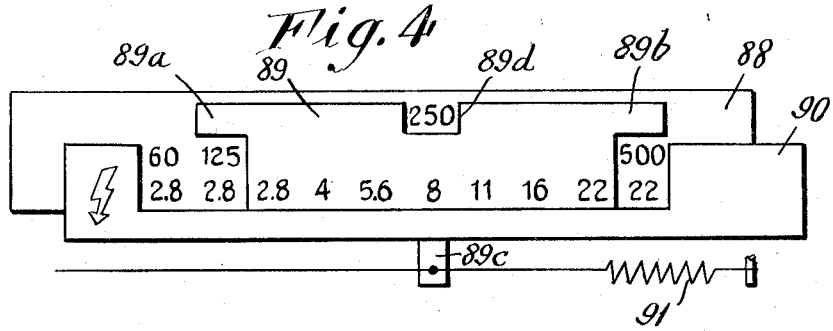

As illustrated in FIGS. 2–4, the indicating flag may have a basically rectangular form with two extensions 89a and 89b on the right and left edges. A catch 89c on the indicating flag or lug may serve for attaching a string or thread 91, the other end of which is secured to a pin 92 carried by a lever 94 pivotally mounted on a fixed pin 93. The bell crank lever 94, in turn, has a pin 95 that extends into a control slot 66b on the shutter speed control 66. A spring 96 is attached to the catch 89c to pull the indicating flag 89 into its right end position. The indicating flag 89 also has a window 89d through which the upper scale row of the fixed scale carrier 88 may be viewed. The exposure time value preselected by means of the shutter speed control 66 appears in this window. Moreover, the indicating flag 89 also carries a diaphragm scale which increases from the left to the right and which carries the diaphragm values from "2.8" to "22."

The mask 90 operatively connected to the film sensitivity control 43 is rigidly attached to the shaft end 38 for positioning the frame 35, and, thereby, the rotating coil 36. Both the mask 90 and the fixed scale carrier 88 carry at their left end a symbol which is intended to indicate that it is necessary to take photographs with artificial light, such as a flashgun, for obtaining useful photographs, if the exposure meter needle 46 is located in this left marginal region.

In the setting position shown in FIG. 3, the structural members 88, 89, and 90 are shown assembled, and the indicating flag 89 covers the upper scale of the preselectable exposure factor, except for the figure "60", which is visible in the window 89d. This means that the exposure time 1/60 sec. has been preselected on the shutter by means of the shutter speed control 66. As long as the exposure meter needle 46 stays within the range occupied by the indicating flag 89, it may be expected that both the preselected exposure time and the diaphragm value indicated on the indicating flag by the exposure meter needle 46 will actually be set. However, if the exposure meter needle 46 points to one of the time/diaphragm pairs which are contained in the two scale groups of the fixed scale carrier 88, it seems that the exposure time corresponding to the preselection and visible in the window 89d, is not being used but that a different exposure time is set according to the time/diaphragm pair indicated by the exposure meter. Referring to FIG. 3, either the exposure value pair 1/30 sec. and "2.8" diaphragm or 1/25 sec. and "22" diaphragm will be set on the shutter in the setting position of the indicating device illustrated. The time/diaphragm pairs from 1/250 sec. and "22" diaphragm to 1/500 sec. and "22" diaphragm are covered by the mask 90. These covered time/diaphragm pairs are, therefore, outside the working range of the camera when taking into consideration the sensitivity of the film that is used.

According to the setting position of the indicating device illustrated in FIG. 4, the exposure time 1/250 sec. is preselected, and the highest film sensitivity contained in the scale 44 is set by means of the film sensitivity control 43. This setting affects the indicating device to the extent that the mask 90 covers the time/diaphragm pair 1/30 sec. and "2.8" diaphragm of the left scale group arranged on the fixed scale carrier 88, while it gives free the time/diaphragm pair 1/500 sec. and "22" diaphragm of the right scale group, which is thereby included in the working range of the camera.

Another possible embodiment of the indicating device according to the invention is illustrated in FIGS. 5 to 7. This indicating device also includes a fixed scale carrier 88′, an indicating flag 89′ and a mask 90′ operatively connected to the film sensitivity control 43. The numerical values of the scale rows 1/30 sec. to 1/500 sec. of the preselectable exposure factor are arranged twice in juxtaposition on the fixed scale carrier 88′. Diaphragm values do not appear on the fixed scale carrier 88′, but, instead, these diaphragm values are carried by the indicating flag 89′ with which there is associated a diaphragm scale comprising the values "2.8" to "22" and whose two extreme values "2.8" and "22" are repeated several times. Instead of the one window 89d of the indicating flag 89, the indicating flag 89′ comprises two windows 89a′ and 89b′. The distance of these two windows from each other is such that the same values of the two scale rows, arranged on the fixed scale carrier of the preselectable exposure factor, always appear therein.

FIGS. 6 and 7 show the indicating device of FIG. 5 with the members properly assembled. According to FIG. 6, the exposure time of 1/60 sec. is preselected on the shutter, so that the numerical value "60" appears respectively in the two windows 89a′ and 89b′. The position of the mask 90′ corresponds to a film of low sensitivity, which is apparent from the fact that the mask covers the time/diaphragm pairs 1/250 sec. and "22" diaphragm and 1/500 sec. and "22" diaphragm. The preselected exposure time of 1/60 sec. is actually set on the shutter, as long as the exposure meter pointer 46 comes to rest below or between the two windows 89a′ and 89b′. The size of the diaphragm aperture being set is readable on the diaphragm scale of the indicating flag 89′ with the aid of the exposure meter pointer 46. But if the exposure meter pointer 46 is on the left side of the window 89a′, the time/diaphragm pair 1/30 sec. and "2.8" diaphragm will be set, while the time/diaphragm pair 1/125 sec. and "22" diaphragm will be set if the pointer is to the right of the window 89b′.

FIG. 7 shows the embodiment at a preselected exposure time of 1/250 sec., in which case the mask 90′ occupies a position that corresponds to the maximum film sensitivity contained in the scale 44 of the film sensitivity setting member 43. The exposure time 1/250 sec. appears twice in the two windows 89a' and 89b'. The time/diaphragm pairs 1/60 sec. and "2.8" diaphragm and 1/125 sec. and "2.8" diaphragm are visible beside the window 89a', while the time/diaphragm pair 1/500 sec. and "22" diaphragm appears to the right of the window 89b'.

In order to ensure that no exposure with automatic setting of the exposure factors time and diaphragm can be effected if the light conditions are outside of the operating range of the camera, an additional locking device is provided. In this connection, it should be recalled that the release bar 28 impinges, after the setting process is terminated, on the release lever 24, which releases the shutter for running down by way of the arresting lever 22. However, according to FIG. 1, if the light conditions make it impossible to make a satisfactory photographic exposure, the release lever 24 will be unable to move, since its arm 24b will rest on an arresting lever 97. The arresting lever 97 is positioned on a fixed pin 98 and is capable of fully absorbing the pressure of the shutter release 28. A coil spring 99 which bears at one end against a fixed pin 100 and, at the other end, against the arresting lever 97, tends to retain the arresting lever in the arresting position shown in the drawing. But the arresting lever carries a pin 101, which cooperates with a cam 52c of the setting ring 52, and as soon as the setting ring 52 moves clockwise by a small amount during the sensing process, the pin 101 is pushed away to the right by the cam 52c, and the arresting lever 97 is pivoted out of the range of the release lever 24. The longitudinal extension of the cam 52c moving the arresting lever 97 is such that, if there is too much light, exceeding the setting range of the camera, the pin 101 of the arresting lever, having reached a setting position of the setting ring 52 corresponding to the time/diaphragm pair 1/500 sec. and diaphragm "22", slides off the cam 52c, thereby enabling the arresting lever 97 to return again to its operative position to prevent the shutter release 28 from actuating the shutter drive mechanism.

In order to obtain the same effect if the light conditions are too weak and hence unsuitable for taking a photograph with automatic exposure setting, a device or mechanism is provided, in accordance with the invention, which, during the sensing process, brings the setting ring 52 to a stop, before its cam 52c is able to become operative on the pin 101 of the arresting lever 97. This device or mechanism comprises an arresting slide 102 which is guided on the frame 35 of the exposure meter, so as to be displaceable parallel to the sensing member 47. The arresting slide 102 has a slot 102a, which is engaged by two guide pins 103 and 104 fixed to the frame 35. A spring 105 which abuts at one end against the arresting slide 102 and, at the other end, against a fixed pin 106, tends to keep the slide in the inoperative position (shown in the drawing), in which it engages a pin 107 of the sensing member 47 due to the action of the spring 105.

If the light is too weak or if the photocell 37 is short-circuited, the exposure meter needle 46 is located under an edge 102b of the arresting slide 102. In this case, when the release bar 28 is depressed, the arresting slide 102, having traveled a short path, is retained by the exposure meter needle 46 which, in turn, bears against the supporting arch 35a. Owing to the pin 107 which rests on the arresting slide 102, the sensing member 47 also comes to a standstill. The short distance traveled by the sensing member 47 during this time is not sufficient to rotate the setting ring 52 to such an extent that its cam 52c causes the release locking device formed by the lever 97 to become inoperative. Only when the light intensity has risen to such an extent that the exposure meter needle 46 releases the edge 102b of the arresting slide, will it be possible to effect an exposure with automatic exposure setting.

As described above, the camera, according to the invention, permits photographs to be taken not only with automatic exposure setting, but also with manual exposure setting by placing the diaphragm control, or setting member 72 at a position within the manual setting range defined by the scale 74. However, since the setting ring 52 is locked in a starting position by the pawl 78 when the control 72 is in its manual range, the cam 52c of the ring 52 will not be able to disconnect the releasable locking device formed by the lever 97. For this reason, the control 72 has a hole, or opening, 72d, into projects the pin 101 secured to the arresting lever 97. If the diaphragm control 72 is moved out of the "Auto" setting position and is set at the range of the diaphragm scale 74, the pin 101 will be pushed out of the opening 72d by the obliquely ascending edge 72e, and this will pivot the arresting lever 97 into its inoperative position.

In the embodiments illustrated in the drawing and described hereinabove, the individual members of the indicating device are made in the form of slides. However, these members may also be made in the form of rotatable discs on which the scales may be arranged in arcuate rows. The arrangement may also be such that the values of the exposure factors indicated (as shown in FIG. 1) become visible in the viewfinder 108 of the camera. As a further alternative, these values may appear in a separate viewing window some place else in the camera. If the values are to appear in the viewfinder, it is advisable to make both the fixed scale carriers 88 and 88' and the indicating flag 89 and 89' of transparent material. A different coloring of the individual members of the indicating devices would further increase the clarity of the presentation.

What is claimed is:

1. A photographic camera comprising an exposure meter; a shutter; a first setting device to set the operating speed of said shutter in accordance with one exposure factor; a diaphragm having an aperture; a second setting device to set the aperture in accordance with a second exposure factor; a setting member connected to one of said devices to pre-select one of said exposure factors; first means connected to and controlled by said meter and connected to the other of said devices to set said other of said devices in accordance with the other of said exposure factors; second means connected to said first means and to said one of said devices to be controlled by said first means and said one of said devices to correct the pre-selection of said one of said exposure factors automatically in accordance with the operation of said exposure meter; and an indicating device connected to said meter to be partially controlled thereby and connected to said setting member to be partially controlled thereby, whereby said indicating device gives information as to the exposure time and diaphragm values actually set in making an exposure.

2. A photographic camera comprising an exposure meter; a shutter; a first setting device to set the operating speed of said shutter in accordance with one exposure factor; a diaphragm having an aperture; a second setting device to set the aperture in accordance with a second exposure factor; a setting member connected to one of said devices to pre-select one of said exposure factors; first means connected to and controlled by said meter and connected to the other of said devices to set said other of said devices in accordance with the other of said exposure factors; second means connected to said first means and to said one of said devices to be controlled by said first means and said one of said devices to correct the pre-selection of said one of said exposure factors automatically in accordance with the operation of said exposure meter; an indicating device comprising a pointer connected to said meter to be controlled thereby; a flag adjacent to said pointer and connected to said setting member to be controlled thereby and a fixed scale carrier adjacent to said pointer and said flag, whereby said indicating device gives information as to the exposure time and diaphragm values actually set in making an exposure.

3. A photographic camera comprising an exposure meter; a movable coil in said exposure meter; a shutter; a first setting device to set the operating speed of said shutter in accordance with one exposure factor; a diaphragm having an aperture; a second setting device to set the aperture in accordance with a second exposure factor; a setting member connected to one of said devices to pre-select one of said exposure factors; first means connected to and controlled by said meter and connected to the other of said devices to set said other of said devices in accordance with the other of said exposure factors; second means connected to said first means and to said one of said devices to be controlled by said first means and said one of said devices to correct the pre-selection of said one of said exposure factors automatically in accordance with the operation of said exposure meter; an indicating device comprising a pointer rigidly connected to said coil to rotate therewith; an indicating flag adjacent to said pointer and connected to said setting member to be moved thereby, said indicating flag having a scale of indicia corresponding to the setting range of said other of said devices, said flag comprising, in addition, at least one marking; and a fixed scale carrier having a scale of indicia corresponding to the setting range of said setting member and cooperating with said marking.

4. The photographic camera of claim 3, in which said marking comprises a window.

5. The photographic camera of claim 4, in which said fixed scale carrier has two additional superposed scales of indicia arranged in a common plane, parallel to the plane of motion of said indicating flag, the upper and lower indicia at each point of said additional scales constituting values indicating the exposure factors and one of said factors is an extreme value of said other of said devices.

6. A photographic camera comprising an exposure meter; a movable coil in said exposure meter; a shutter; a first setting device to set the operating speed of said shutter in accordance with one exposure factor; a diaphragm having an aperture; a second setting device to set the aperture in accordance with a second exposure factor; a setting member connected to one of said devices to pre-select one of said exposure factors; first means connected to and controlled by said meter and connected to the other of said devices to set said other of said devices in accordance with the other of said exposure factors; second means connected to said first means and to said one of said devices to correct the preselection of said one of said exposure factors in accordance with the operation of said exposure meter; an indicating device comprising a pointer rigidly connected to said coil to rotate therewith; an indicating flag adjacent to said pointer and connected to said setting member to be moved thereby, said indicating flag comprising two windows; and a fixed scale carrier having two successive scales of indicia corresponding to the setting range of said setting member and cooperating with said windows, said scale carrier comprising two covering flags on opposite sides thereof, said indicating flag having in addition a scale of indicia corresponding to the setting range of said other of said devices the extreme values of which are repeated several times, said covering flags being interposed in front of part of said extreme values.

7. The photographic camera of claim 6 comprising, in addition, a special reference mark for artificial light exposures on said scale carrier.

8. A photographic camera comprising an exposure meter; a coil in said meter; a film sensitivity control to adjust said meter is accordance with film sensitivity; a shutter; a first setting device to set the operating speed of said shutter in accordance with one exposure factor; a diaphragm having an aperture; a second setting device to set the aperture in accordance with a second exposure factor; a setting member connected to one of said devices to pre-select one of said exposure factors; first means connected to and controlled by said meter and connected to the other of said devices to set said other of said devices in accordance with the other of said exposure factors; second means connected to said first means and to said one of said devices to be controlled by said first means and said one of said devices to correct the pre-selection of said one of said exposure factors automatically in accordance with the operation of said exposure meter; and an indicating device connected to said meter to be partially controlled thereby and connected to said setting member to be partially controlled thereby and a mask connected to said film sensitivity control to be moved thereby, whereby said indicating device gives information as to the exposure time and diaphragm values actually set in making an exposure.

9. The photographic camera of claim 8 comprising a fixed scale carrier having a scale of indicia corresponding to the setting range of said setting member and a first special reference mark for artificial light exposures below the lowest value on said last-named scale; and a corresponding special reference mark for artificial light exposures on a portion of said mask which moves in front of said first special reference mark on said fixed scale carrier.

10. The photographic camera of claim 8, in which said mask is rigidly connected to a portion of said exposure meter to rotate therewith under the control of said film sensitivity control.

11. A photographic camera comprising an exposure meter; a sensing member connected thereto; a coil in said exposure meter; a pointer connected to said coil; a frame for said coil; a locking slide guided on said frame and cooperating with said sensing member to engage said pointer when there is insufficient light; a shutter; a first setting device to set the operating speed of said shutter in accordance with one exposure factor; a diaphragm having an aperture; a second setting device to set the aperture in accordance with a second exposure factor; a setting member connected to one of said devices to pre-select one of said exposure factors; first means connected to and controlled by said meter and connected to the other of said devices to set said other of said devices in accordance with the other of said exposure factors; second means connected to said first means and to said one of said devices to be controlled by said first means and said one of said devices to correct the pre-selection of said one of said exposure factors automatically in accordance with the operation of said exposure meter; and an indicating device connected to said meter to be partially controlled thereby and connected to said setting member to be partially controlled thereby, whereby said indicating device gives information as to the exposure time and diaphragm values actually set in making an exposure.

References Cited by the Examiner
UNITED STATES PATENTS

| 3,077,151 | 2/1963 | Weller | 95—10 |
| 3,126,800 | 3/1964 | Mass | 95—10 |
| 3,127,822 | 4/1964 | Kiper | 95—10 |

JOHN M. HORAN, *Primary Examiner.*